(12) United States Patent
Fitch et al.

(10) Patent No.: US 10,859,990 B2
(45) Date of Patent: *Dec. 8, 2020

(54) METHOD AND SYSTEM FOR UTILIZING A DEVICE'S USER LOCATION TO MONITOR AND CONTROL THE DEVICE POWER USAGE

(71) Applicant: BCP CONTROLS, LLC, Waco, TX (US)

(72) Inventors: John Edward Fitch, Woodway, TX (US); James Michael Steward, Crawford, TX (US)

(73) Assignee: BCP CONTROLS, LLC, Waco, TX (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/899,297

(22) Filed: Feb. 19, 2018

(65) Prior Publication Data

US 2018/0210409 A1 Jul. 26, 2018

Related U.S. Application Data

(63) Continuation of application No. 15/134,231, filed on Apr. 20, 2016, now Pat. No. 9,897,989, which is a (Continued)

(51) Int. Cl.
*G05B 19/042* (2006.01)
*H02J 3/14* (2006.01)
(Continued)

(52) U.S. Cl.
CPC ....... *G05B 19/042* (2013.01); *G06K 7/10366* (2013.01); *H02J 3/14* (2013.01);
(Continued)

(58) Field of Classification Search
CPC .......... G06F 1/26; G06F 1/3203; G06F 1/325; G05B 19/042; G05B 2219/2639;
(Continued)

(56) References Cited

U.S. PATENT DOCUMENTS 6,528,957 B1 3/2003 Luchaco
7,089,089 B2 8/2006 Cumming et al.
(Continued)

FOREIGN PATENT DOCUMENTS

EP 2457132 A1 5/2012

*Primary Examiner* — Michael J Brown
(74) *Attorney, Agent, or Firm* — David G. Henry, Sr.

(57) ABSTRACT

An autonomous system for managing power distribution to an electrically-powered device that includes a power controller module that includes power input and power output abilities and operably connected power switching abilities, wherein the power switching is configured for actuation by an integral power management module operably connected thereto, the integral power management module including integral actuation signal detection and actuation abilities configured for, in accordance with commands and operational parameters, upon detection of an actuation signal, actuation the integral power switching to alter power output through the power output from a first output level to a second output level. The system further includes memory for storing the commands an operational parameters, and wherein the actual signal include an identification component for identifying an actuating signal, and wherein the integral actuation signal detection and actuation is configured for, upon detecting signals other than actual signals, reacting other than in response to the actuation signal.

12 Claims, 4 Drawing Sheets

Overall System Block Diagram

Related U.S. Application Data continuation-in-part of application No. 14/011,565, filed on Aug. 27, 2013, now Pat. No. 9,342,125.

(60) Provisional application No. 61/694,113, filed on Aug. 28, 2012, provisional application No. 62/261,656, filed on Dec. 1, 2015.

(51) Int. Cl.
  *G06K 7/10* (2006.01)
  *H02J 13/00* (2006.01)
  *G06F 1/26* (2006.01)
  *G06F 1/3203* (2019.01)

(52) U.S. Cl.
  CPC .. *H02J 13/0006* (2013.01); *G05B 2219/2639* (2013.01); *Y02B 70/30* (2013.01); *Y02B 70/3225* (2013.01); *Y04S 20/222* (2013.01); *Y04S 20/242* (2013.01)

(58) Field of Classification Search
  CPC ....... G06K 7/10366; H02J 3/14; Y02B 70/30; Y02B 70/3225; Y04S 20/222; Y04S 20/242
  USPC .................................. 713/300, 320, 323, 340
  See application file for complete search history.

(56) References Cited

U.S. PATENT DOCUMENTS

| | | |
|---|---|---|
| 7,142,994 B2 | 11/2006 | Rao et al. |
| 7,208,697 B2 | 4/2007 | Blankenship et al. |
| 7,369,968 B2 | 5/2008 | Johnson et al. |
| 8,004,271 B2 | 8/2011 | King et al. |
| 8,024,073 B2 | 9/2011 | Imes et al. |
| 8,082,065 B2 | 12/2011 | Imes et al. |
| 8,099,195 B2 | 1/2012 | Imes et al. |
| 8,108,076 B2 | 1/2012 | Imes et al. |
| 8,174,381 B2 | 5/2012 | Imes et al. |
| 8,258,654 B2 * | 9/2012 | Parsons .............. H05B 37/0227 307/116 |
| 8,352,768 B2 | 1/2013 | Starr et al. |
| 8,484,494 B2 | 7/2013 | Siegel et al. |
| 8,508,148 B1 * | 8/2013 | Carley ................... H01R 33/94 200/51.02 |
| 9,342,125 B1 | 5/2016 | Fitch et al. |
| 9,897,989 B2 * | 2/2018 | Fitch ................... G05B 19/042 |
| 10,042,403 B2 * | 8/2018 | Wendt ............... H05B 33/0842 |
| 2002/0010518 A1 | 1/2002 | Reid et al. |
| 2006/0036675 A1 | 2/2006 | Crichlow |
| 2008/0270814 A1 | 10/2008 | Starr et al. |
| 2010/0148983 A1 | 6/2010 | Huxley et al. |
| 2010/0189208 A1 | 7/2010 | Fudge et al. |
| 2010/0277280 A1 | 11/2010 | Burkart et al. |
| 2010/0277283 A1 | 11/2010 | Burkart et al. |
| 2010/0277285 A1 | 11/2010 | Anderson et al. |
| 2010/0278214 A1 | 11/2010 | Westcott et al. |
| 2011/0119515 A1 | 5/2011 | Sadwick et al. |
| 2011/0173542 A1 | 7/2011 | Imes et al. |
| 2011/0202185 A1 | 8/2011 | Imes et al. |
| 2011/0214060 A1 | 9/2011 | Imes et al. |
| 2011/0224838 A1 | 9/2011 | Imes et al. |
| 2011/0246898 A1 | 10/2011 | Imes et al. |
| 2011/0292869 A1 | 12/2011 | Krieter |
| 2012/0046859 A1 | 2/2012 | Imes et al. |
| 2012/0059530 A1 | 3/2012 | Luo et al. |
| 2012/0064923 A1 | 3/2012 | Imes et al. |
| 2012/0080949 A1 | 4/2012 | Gelonese |
| 2012/0109397 A1 | 5/2012 | Shim et al. |

\* cited by examiner

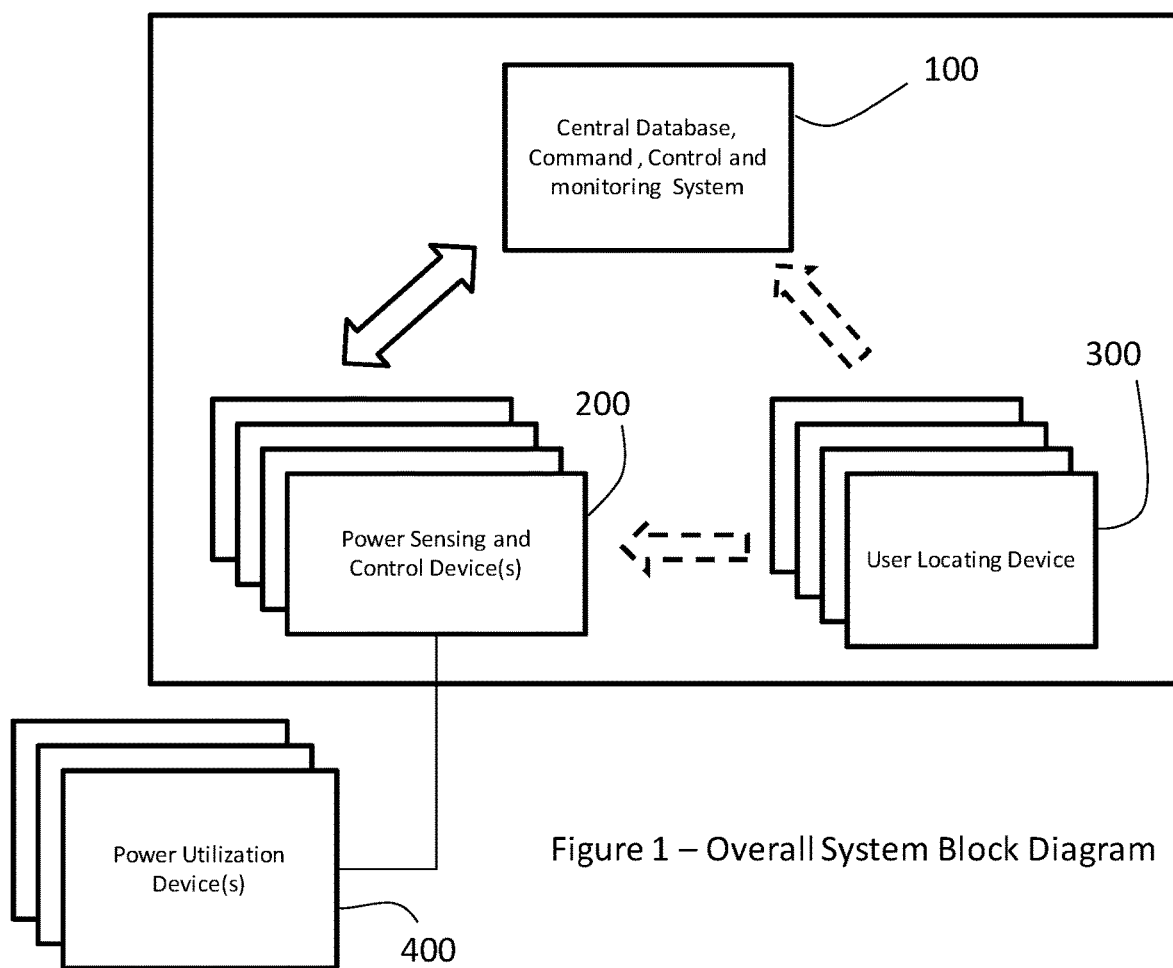
Figure 1 – Overall System Block Diagram

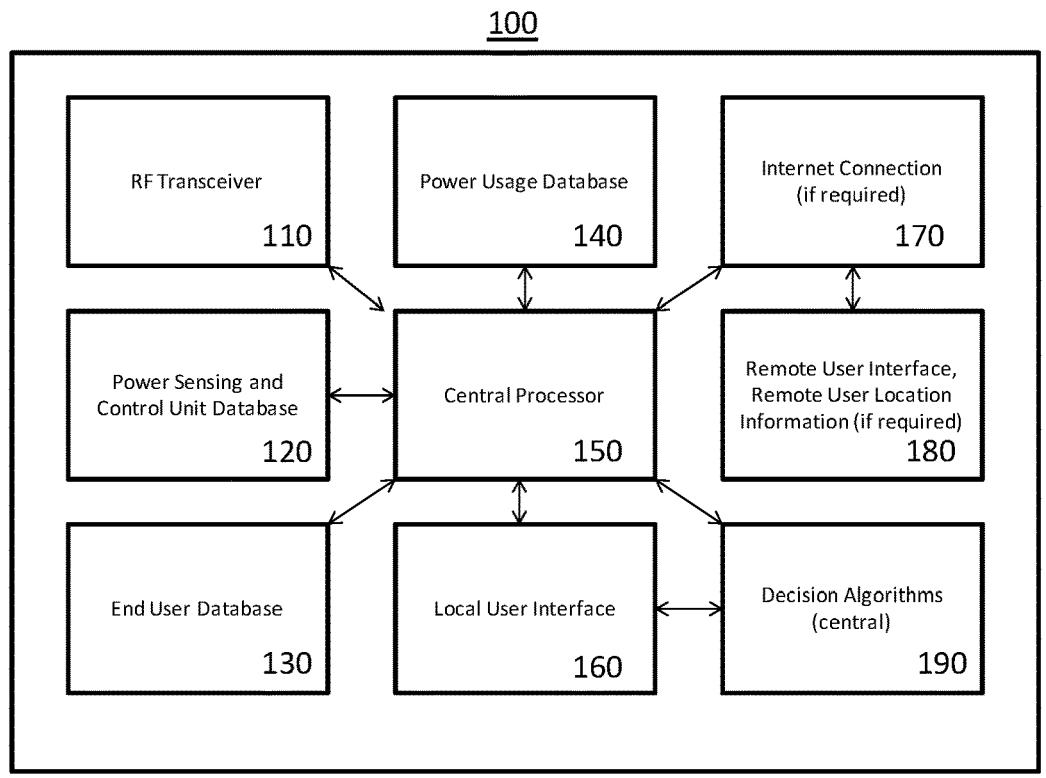
Figure 2 – Central Database command, control and monitoring block diagram (CR)
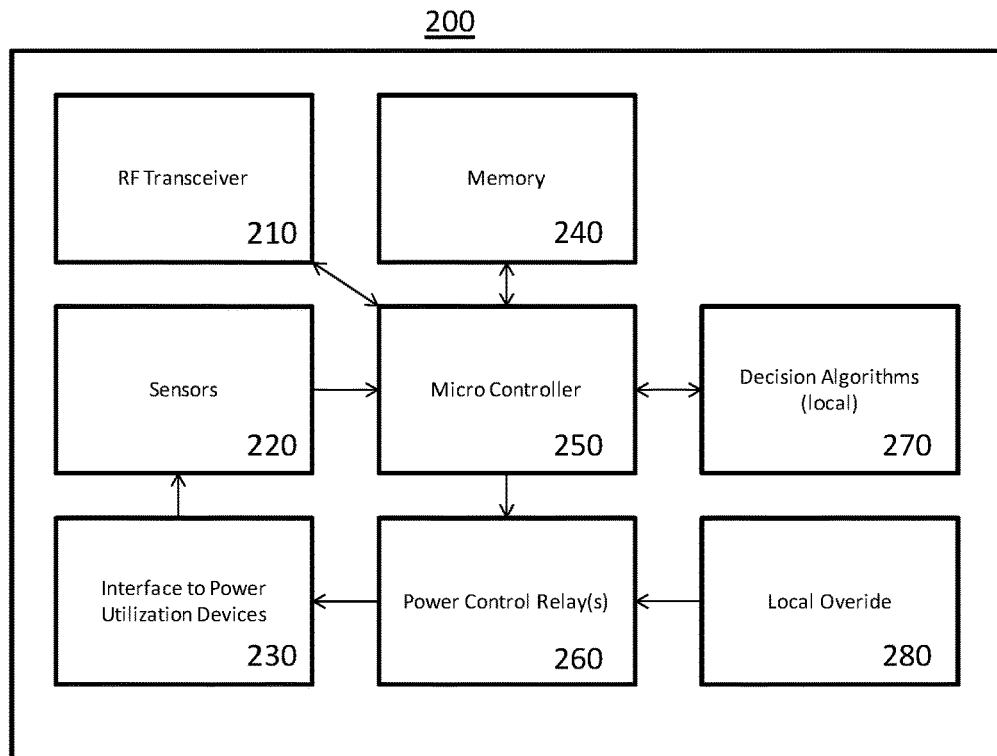
Figure 3 – Power Sensing and Control Device (SPS) Block Diagram

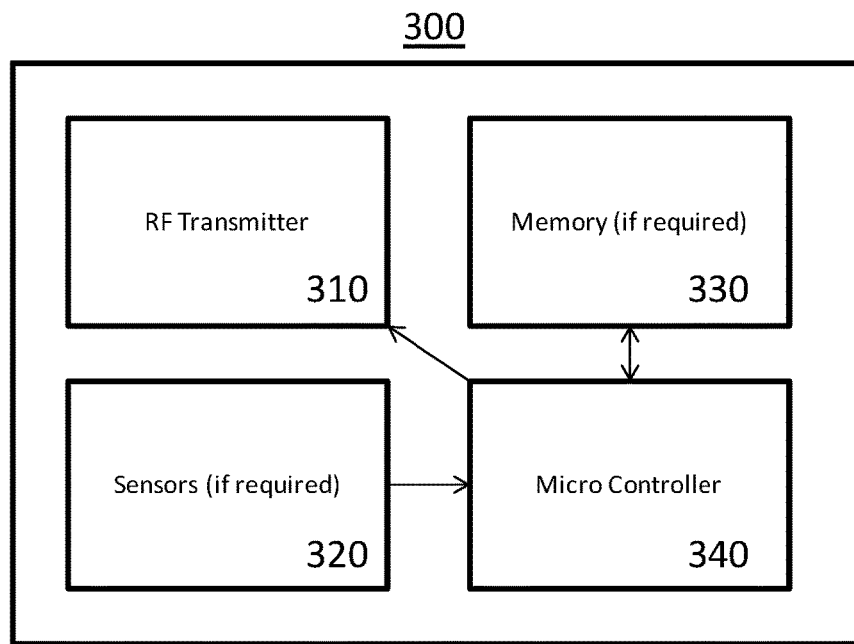
Figure 4 – User Location Device (UD) Block Diagram
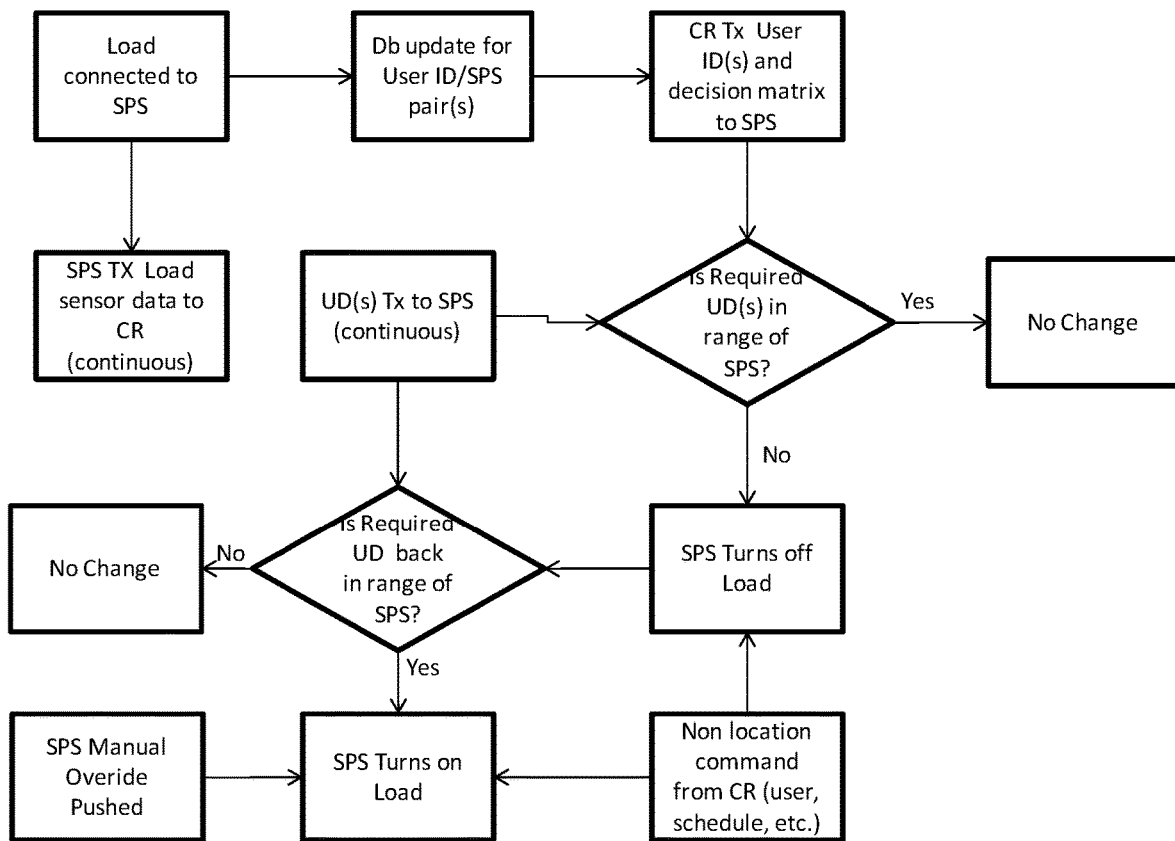
Figure 5– SPS sensed UD Proximity Flow Diagram

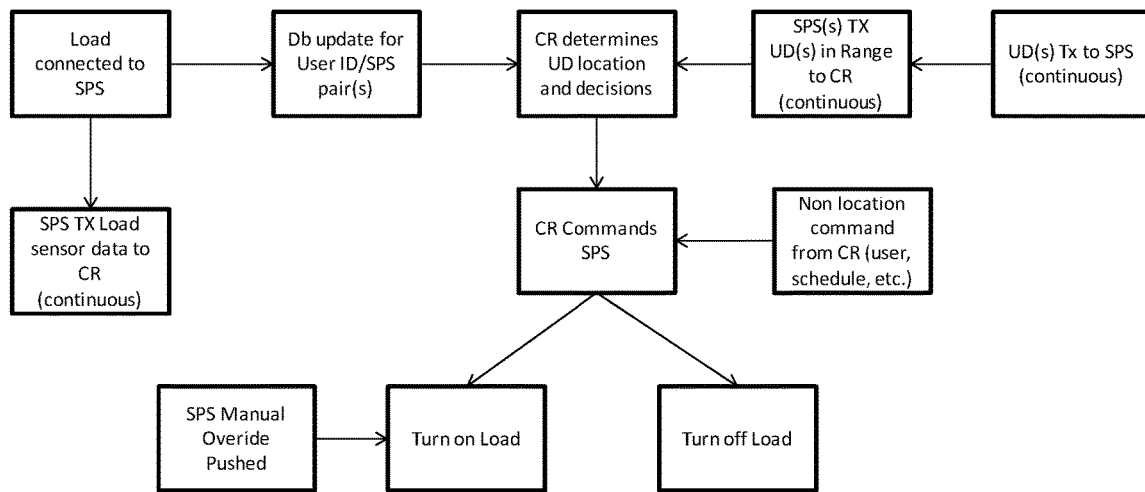
Figure 6– SPS reporting UD Proximity Flow Diagram
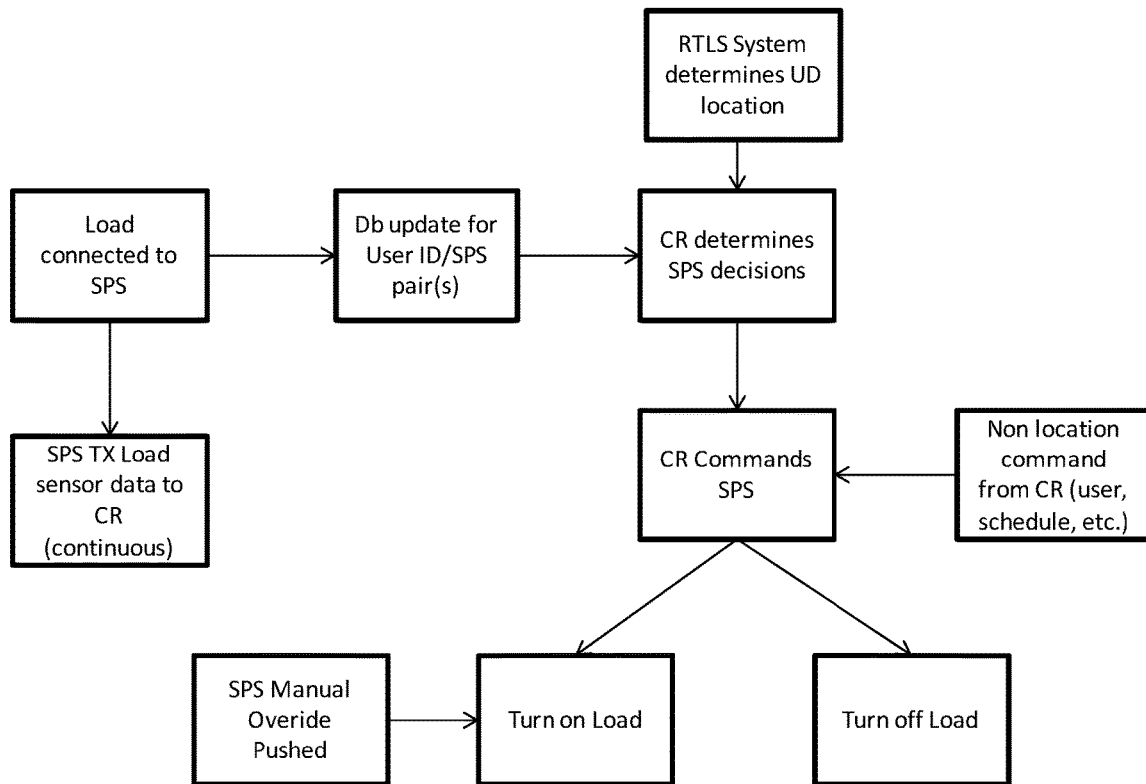
Figure 7–UD RTLS Flow Diagram

METHOD AND SYSTEM FOR UTILIZING A DEVICE'S USER LOCATION TO MONITOR AND CONTROL THE DEVICE POWER USAGE

CITATION TO PRIOR APPLICATIONS

This application is a continuation of and claims priority to U.S. Nonprovisional application Ser. No. 15/134,231, entitled "Method and System for Utilizing a Device's User Location to Monitor and Control the Device Power Usage," filed on Apr. 20, 2016, which is a continuation-in-part of, and claims priority to U.S. Nonprovisional application Ser. No. 14/011,565, entitled "Method and System for utilizing a device's user location to monitor and control the device power usage," and filed on Aug. 28, 2013, which claims priority to U.S. Provisional Application Ser. No. 61/694,113, entitled "Method and System for utilizing a device's user location to monitor and control the device power usage," filed Aug. 28, 2012. This application further claims priority to U.S. Provisional Application Ser. No. 62/261,656, entitled "Method and System for utilizing a device's user location to monitor and control the device power usage" and filed Dec. 1, 2015.

TECHNICAL FIELD

A method and system for utilizing a device's user[s] location[s] to monitor and control the device power usage.

BACKGROUND OF THE INVENTION

Accurate monitoring and control at the individual electrical device level provides a significant opportunity to limit electrical power utilization to the minimum necessary for the needs of the device user. In addition, most electrical devices require the close proximity of the end user to provide useful output (lights, monitors, space heaters). There are a number of devices currently available that offer limited monitoring and control of electrical devices based on schedules, sensing, or manual user configurations. Brambley et al. stated in their support for advanced sensors and controls that "controls appear to have the potential to significantly reduce commercial building energy consumption in the United States, but, at present, building controls have probably realized only a fraction of their national energy-savings potential. Overall, Energy Management Control Systems (EMCSs) manage only about one-third of commercial building floor space (.about.10% of all buildings), while more advanced control approaches have an even smaller market share".

The ability to provide significant monitoring and control at the individual plug node, sensed node or switched node level faces a number of challenges for both commercial and residential users. In order to solve these issues, the present invention provides a simple system for monitoring and controlling power to individual plug, sensed or switched loads based on the proximity of the user to the device thereby minimizing overall power utilization. Additional characteristics of the present invention include ease of installation and automation of controls to limit end user requirements, providing for cost-effective use.

DESCRIPTION OF THE DRAWINGS

FIG. 1 depicts the overall system block diagram, according to one or more embodiments, showing the three primary components of the proposed invention to include; the Power sensing and control device (200) [SPS], the central control receiving unit (100) [CR], and the user locating device (300) [UD]. FIG. 1 also depicts the interface to the electrical device being monitored and controlled (400). Depending on configuration being used, FIG. 1 depicts the user locating device (300) as communicating either to the central control unit (100) or the power sensing and control device (200).

FIG. 2 depicts the various functional, physical and/or logical sub components that comprise the central control unit (100), according to one or more embodiments. FIG. 2 also depicts how these items logically interact with each other. This unit is hereafter referred to as the CR unit.

FIG. 3 depicts the various functional, physical and/or logical sub components that comprise the power sensing and control device, according to one or more embodiments. FIG. 3 also depicts how these items logically interact with each other. This unit is hereafter referred to as the SPS unit.

FIG. 4 depicts the various functional, physical and/or logical sub components that comprise the User location device (300), according to one or more embodiments. FIG. 4 also depicts how these items logically interact with each other. This unit is hereafter referred to as the UD unit.

FIG. 5 depicts the logical flow diagram for the configuration where the SPS directly senses the proximity of the UD and controls the power availability to the electrical device based directly on that proximity, according to one or more embodiments. In this configuration, after initial set up from the CR to the SPS, the CR is not required for any power control decisions and functions only in a passive monitoring capacity. The SPS is the active power control decision device based on information from the UD.

FIG. 6 depicts the logical flow diagram for the configuration where the SPS directly senses the proximity of the UD and reports the UD information to the CR where the CR determines the appropriate actions and commands the individual SPS controls, according to one or more embodiments. In this configuration, the CR is the active power control decision device based on the pass through UD data from the SPS.

FIG. 7 depicts the logical flow diagram for the configuration where a separate real time location system determines the UD location and transmits that location to the CR which then determines the appropriate action and commands individual SPS controls, according to one or more embodiments. In this configuration, the CR is the active power control decision device based on UD data received separately from the SPS.

DETAILED DESCRIPTION

In the following description of the present invention there are multiple details established to provide a thorough understanding of the invention and the preferred implementations of the invention. It should be clear that the description is not intended to limit the invention to these specific embodiments and that variations, changes, substitutions, or equivalent components will be apparent to those skilled in the art and should not be considered significant differences from the intended scope of the invention.

The invention intends to monitor and control the use of electricity to electrical devices. The invention is intended to apply to the monitoring and control of any and all pluggable electrical devices, permanently installed buss bar connected electrical devices, permanently installed switch controlled electrical devices or permanently installed sensor controlled electrical devices. FIG. 1 depicts the interface between the power sensing device [SPS] (200) and the power utilization device (400) as well as the interfaces between the three primary units of the present invention, according to one or more embodiments. As depicted, the arrows in FIG. 1 depict the flow of information from one subsystem to another. The dashed arrows in FIG. 1 depict that the information from the UD (300) can be transmitted either to the CR (100) or to the SPS (200) depending upon the desired configuration. The figure is also intended to convey that there can be multiple electrical devices connected to either a single or multiple SPSs and each SPS can work with either a single or multiple UDs.

In sum, in one embodiment, the system of FIG. 1 employs the UD 300 as a "dumb" asynchronous transmitter (as described in further detail below) which is communicably coupled to an interface, such as the SPS 200, capable of monitoring and controlling any type of end device—with or without a centralized system. Advantageously, such enables a simple, cost effective, extensive, scalable, and autonomous control and monitoring system at a level that has not been previously accomplished. Such a system may be capable of, and configured to perform monitoring at the individual end device level for any device. Moreover, the system may be configured to perform proximity based control at the individual device level.

Such a system may be employed in various application and settings, such as commercial applications, residential applications, and various simple systems due to the ease of installation, autonomous controls, and cost effectiveness. The system may be capable of controlling individual devices by multiple users, and/or control and monitoring of an entire building of user devices 300.

The CR unit (100) is depicted in detail in FIG. 2, according to one or more embodiments. The CR consists of a central processor (150), an RF Transceiver (110), a database of the SPSs (120), a database of UDs (130), a database of power utilization for each node of the SPS (140), an interface for a local user to monitor and control the system (160), an internet connection (170), a remote user interface (180), and one or more decision algorithms (190).

The central processor (150), local user interface (160), various databases (120, 130, 140), internet connection (170) and decision algorithms (190) may, in one embodiment, be comprised of a single personal computer, notebook, tablet or smart phone capable of hosting various software and providing display and human machine interfaces. For example, the current embodiment utilizes a PC based system running widows 7 and utilizing various customized software for data acquisition, database storage, display, decision management, control and reporting. The SPS database (120) consists of tables of information on various SPS configurations, locations, communications protocols, sensor types, sensor calibration numbers, connected power utilization devices attached to the SPS, sensing limits and UD assignments. The End user database (130) consists of various tables of UD configuration, names of individuals assigned to the UD, communication protocols for each UD and time and sensor location of the sensed UD. The Power Usage database (140) consists of tables of information on power usage from each sensor on each SPS. This information includes unconverted transmitted data as well as converted data based on individual sensor calibration information. Sensor data is not limited to power sensing and may include environmental or motion sensing information. The decision algorithms (190) can consist of a variety of items but effectively use logical rules and the information from the individual databases to determine both the current state and the desired state of an individual control node. If the current state is different from the desired state, the central processor may institute a change communication to bring the node from the current state to the desired state. In one embodiment, this may be implemented via a "watch dog" timer or programming, as typically known to those skill in the art. For example, if the node is in a particular state beyond a predetermined period of time, the system may reset, restart, or "reconnect" to the node in order to re-synchronize the node to the system and/or assure the node is in the desired and expected state.

The RF transceiver (110) is intended to be any one of a number of possible devices including proprietary RF communication, Wi-Fi, Bluetooth, UWB, ZigBee or other IEEE supported protocols. The device is in communication with the central processor through any one of a number of wired or wireless standard or proprietary protocols including USB, Wi-Fi, Bluetooth, UWB, ZigBee or other IEEE supported protocols.

If desired, the central processor can communicate through various wired or wireless standard or proprietary protocols (170) to a remote interface unit (180) allowing a physically remote user to monitor and control each of the SPS nodes independently through the internet or cell communications. The remote unit (180) can be another computer, tablet, smartphone or other device.

The CR 100 may receive data packets from one or more SPS's 200, for example via TCP/IP from a wireless transceiver. The TCP/IP forwarder may send the data to a database controller (not depicted) which may have access to one or more databases. In further embodiments, the SPS 200 data may be split out by the database controller into constituent packets by type of information (e.g., tag, sps, command verification, etc.) and time tagged when written to the database. Alternatively, or in addition thereto, the data may be segregated by groups (e.g., areas, buildings, companies, etc.) to facilitate data analysis and processing. Moreover, data calibration may be performed by the CR 100 based on such information, and/or including sensor and connected load type.

In even further embodiments, the CR 100 may include multiple and various programs to facilitate device installation, verification, commanding, and data analysis. These may include, for example, query programs, report generation programs, data graphing programs, etc. Other programs may be specific for energy use and cost as well as user proximity behavior.

In one embodiment, CR commanding program and database controller use data from SPSs 200 to identify individual transceivers to command to change SPS parameters. Advantageously, this minimizes command data transmission. Commands may be sent multiple times in quick succession to span the arbitrary timing of the SPS. In this way, regardless of the asynchronous behavior of the SPS, blind transmissions will have a high probability of being heard and acted upon.

Moreover, CR 100 command program may include the capability to automatically review data after a command was sent from an SPS 200 and determine if the command was received and acted upon. If not, the command program can be told to resend the command until the SPS 200 hears the command. This is a result of using a blind transmission technique. Based on available limits in the CR 100 for a given SPS load combination, the CR 100 can identify off nominal conditions and execute a variety of actions, for example, no action, logging, notification of user, command to different state or combination thereof.

CR 100 can reside in proximity to the SPS 200 (local), or, in other embodiments, can make use of and internet location or intranet location. CR security hierarchy and protocols can be set at an individual or functional level and allows limitations on controls and monitoring based on, locations, personnel, devices, etc.

Those skilled in the art will appreciate that in at least one embodiment, the CR 100 is not required at all for proximity control between the SPS's 200 and UD's 300.

FIG. 3 depicts one embodiment of the individual logical and functional components of the SPS (200) to include and RF transceiver (210), various sensors (220), an interface to a power utilization device (230), logical memory (240), a microcontroller (250), relays to control power flow (260), decision algorithms (270), and a local override device (280). The microcontroller (250) provides the ability to communicate through the RF transceiver (210) to the UDs and the CR as well as the ability to interrogate the various sensors (220) and to use the decision algorithms (270) and memory (240) to properly interpret the sensed data and control the flow of electricity through the interface (230) by controlling the power relays (260). The current embodiment utilizes a System on a Chip (SOC) to encompass the functions of the RF transceiver (210), memory (240), and microcontroller (250). Furthermore the SOC provides the analog and digital interfaces to the sensors (220) and allows decision algorithms (270) to be stored in local memory (240). If required, the SPS can be battery powered or connected to a power source.

The sensors (220) can be, for example and without limitation, current sensors, power sensors, load sensors, voltage sensors, temperature sensors, motion sensors, radiation sensors, or other sensors. They can have either a digital or analog interface to the microcontroller (250). The sensors work through the interface to the power utilization device to accurately monitor the amount of power being used by each device being sensed. Moreover, the SPS 200 may come in a variety of packaging, including but not limited to, power strips, dimmers, power plugs, and/or light switches.

The power control relays (260) are used to interrupt or allow power to flow through the interface (230) to the power utilization device. The power relays can be controlled either by commands from the microcontroller (250) or from a local override device (280). The local override device (280) is a switch that turns power on or off to the interface (230) by overriding the command from the microcontroller (250).

The decision algorithms (270) can be either control algorithms for the relays (260) or can be algorithms for properly interpreting the sensor (220) data such as a peak detection algorithm or integration algorithm.

As discussed above, according to one embodiment, the SPS 200 may control the load based on proximity (or lack of proximity) of a UD 300. No central system is required, however, in some embodiments, a central system, such as the CR 100 may be employed. The SPS 200 may be reprogrammable remotely for many use case parameters based on installation or use—no network is necessarily required as commands may be sent "blind" (e.g., based on a variable timer). The variable timer may be based on both a program setting and on a random number to help ensure that blind communications are randomly spaced so as not to interfere with multiple asynchronous transmissions from other devices. For example, the timer may be approximately every 10 seconds +/−a random 1.5 seconds. Advantageously, such enables scalability of the system to thousands of devices or more.

The SPS data may include data for one or more of the sensors described above, thereby including load data, temperature sensor data, voltage and/or current sensor data, etc. Moreover, the SPS data may include configuration data (e.g., relay and/or dimmer settings), UD 300 IDs the SPS has seen/obtained data from, UD 300 received signal strength data, UD 300 temperature, and/or UD 300 voltage. Additionally, the SPS data may indicate if the user has changed the confirmation manually, and/or state if it had received a valid command and acted upon it. The SPS 200 may further calibrate the sensors and variable load controls (e.g., different 0-10 v dimmable drivers output differently for different control inputs). The SPS 200 may use specific logic to identify controlling UD 300 presence or absence and act accordingly. In one embodiment, a programmable "absent" interval for state changes is programmed.

The SPS 200 may be programmed such that different actions are based on multiple UDs 300 or user preferences, including hierarchies of behavior. Typically this allows individual controls on the SPS 200 to be controlled exclusively by one UD 300 or allows different behavior for multiple UDs 300 for instances of shared SPS, shared use of a given load, or shared use of a given space affected by the attached load. In one embodiment, the behavior is programmed via a firmware update of the SPS 200. Alternatively, behavior may be wirelessly assignable based on each user, and/or parameters based on a user's preferences. Exemplary actions may include, but are not limited to, on when present and off when absent, on when absent and off when present, always on, always off, manual, load limit when turned on, load limit when UD 300 present, load limit when UD 300 absent, change load limit continuously when UD 300 continuously present, and/or step down load limit when UD 300 absent.

In further embodiments, the SPS 200 may be programmed such that control modes also include a repeat capability to 'rebroadcast' UD 300 present data to improve synchronization of multiple SPS's responding to the same UD 300 proximity, and/or the capability to 'rebroadcast' UD 300 present data based on hearing tags continuously to reduce 'false off' potential with multiple SPSs when UD 300 is present.

In even further embodiments, the SPS 200 is capable of distinguishing between an original UD 300 broadcast and a rebroadcast to minimize rebroadcasts and reduce communication conflicts with other commands. For example, such may be due to the broadcast and rebroadcast transmissions being different frequencies.

In other embodiments, the SPS 200 ID is wirelessly reprogrammable, as is the SPS 200 transmission frequency, thereby enabling scaling to thousands of units in a given space. Moreover, the SPS 200 may include a proprietary protocol that includes a sync word assignment which may be changed wirelessly. Additionally, the SPS can be placed into a local group to allow synchronization of commanding and use case behavior between multiple devices. Additionally, the SPS 200 may have a global command to allow synchronization of commanding and use case on a building level (i.e. emergency situations—all lights on full, all devices powered off).

FIG. 4 depicts the various components associated with the UD (300), according to one or more embodiments. The UD is comprised of a microcontroller (340), and an RF transmitter (310). In one embodiment, the RF transmitter 310 may communicate at 915 MHz and/or use a proprietary transmission protocol that employs "blind" communication, as discussed above. Therefore, it can be used where one UD 300 controls many devices, many UD 300 control many devices, many UD 300 control one device, or multiple UD 300 may have the same id based on use case. If required, the UD can include sensors (320) and/or local memory (330). The UD is intended to be battery powered and physically located with the user similar to an active RFID device.

The microcontroller (340) provides the ability to communicate through the RF transceiver (310) to the SPS and/or the CR as well as the ability to interrogate the various sensors (320) and to use a command set and memory (330) to properly interpret the sensed data. The current embodiment utilizes a System on a Chip (SOC) to encompass the functions of the RF transceiver (310), memory (330), and microcontroller (340). Furthermore the SOC provides the analog and digital interfaces to the sensors (320) and allows the command set to be stored in local memory (330).

The current embodiment of the UD 300 goes from a sleep mode to a wake mode approximately every 4 seconds. In wake mode the UD 300 may transmit, for example and without limitation, the UD ID number, UD 300 temperature (with appropriate sensors), indication that the transmission is a proximity UD transmission and not a repeated UD transmission from another device, and/or current battery level and returns to sleep mode. No acknowledgement of receipt of information is made to the UD. It is a 'dumb' asynchronous transmitter.

In further embodiments, the transmission strength may be adjustable within the approved FCC ISM band parameters to allow adjustable proximity range to controlled device. Such may be advantageous to save energy and also provide an enhanced user experience (e.g. based on use case, such as dimmers, and RSSI filters on an end device.) The transmission frequency (how often the UD 300 transmits) may also be adjustable based on a user's activity. For example, a user who generally walks around with the UD 300 may require a UD 300 which transmits less often than a forklift driver who will move faster and require increased response times. Advantageously, such provides a balance of batter saving and enjoyable user experience. Moreover, further battery savings may be obtained in other embodiments by inclusion of a "lower power" and/or "sleep" mode, wherein such is activated by a duty cycle and/or a switch (i.e., a sensor), one or both of which may be adjustable.

In even further embodiments, UD 300 may have additional functionality based on buttons or sensors (not depicted) on the UD 300. Buttons may be used to create additional commands from the UD 300 to the units being controlled such as a remote control for on/off or dim levels. Buttons also function to provide user communications for automatic programming of the system such as setting the preferred light level on UD 300 presence or which plugs to switch on based on UD 300 presence. Alternatively, or in addition thereto, UD 300 may include a switch (not depicted) to allow transmissions to be turned off by user for various use cases (i.e. and office environment typically wants devices on when person is present, whereas a residential setting may desire items switched off during times when user is still there such as in a room during sleep.).

UD 300 may come in a variety of shapes and sizes including but not limited to key fobs, security badges, and wallet cards. Moreover, UD 300 communications and functionality may be applied as an application on a mobile device, such as a smart phone or tablet computer, although such an embodiment may entail one or more dimmers, sps, or sls acting as a translator to the proprietary protocol of the normal control devices. In one embodiment, the mobile device would transmit a blind ID which would be translated in both carrier frequency and protocol to the other control devices in its immediate proximity.

The devices described in FIGS. 1-4 can be utilized in a number of logical configurations to provide monitoring and control of electrical loads based on user proximity to the electrical device. FIG. 5 depicts the logical flow diagram for the first of 3 independent configurations for the present invention, according to one or more embodiments. In this configuration, the SPS (200) is connected to an electrical load desired to be sensed and controlled. The SPS information, load information and intended load user is uploaded to the CR. Based on its decision algorithm, the CR transmits control logic information to the SPS. The SPS begins to sense and transmit the power utilization information of each node to the CR for database storage, display and reporting. Through the SPS transceiver, the SPS listens for communication from the UD or UDs associated with the connected load. The UDs transmit their identification continuously. If the UDs are in and remain in range of the SPS, the SPS makes no change to the flow of electricity to the load. If the UDs go out of range of the SPS receiver for greater than a predetermined time period, the SPS utilizes its control algorithms to turn off the connected load until the UD(s) come back into range of the SPS. All power control decisions are accomplished by the SPS microcontroller without further communication to or from the CR. In this mode, the CR monitors changes but does not control the local SPS.

In the current embodiment whenever the UD signal is received by the SPS, an internal SPS timer is reset to indicate user presence. With the UD transmitting approximately every 4 seconds, this SPS internal timer is set to approximately 1 minute and must be reset by the receipt of the UD RF signal to continue to allow power to the controlled devices. If the SPS timer is not reset before it expires, power to the devices being controlled is removed and the SPS waits until it receives the UD signal before turning on power to the devices being controlled and resetting the timer.

In the current embodiment, the SPS cycle of listening for the UD's, monitoring the power load from its controlled devices, and transmitting its information to the CR, is approximately every 10 seconds. The SPS transmits the ID of any UD's heard in that 10 seconds, the power being used by the various SPS sensed loads, and the SPS ID information to the CR. The SPS information is transmitted to the CR asynchronously and without an acknowledgement from the CR.

If the user determines that the state of a given node is not what is desired they can utilize the manual override on the SPS to change the state of the node. In the current embodiment, the manual override changes the relay state but does not change the microcontroller sequence relative to its decisions based on UD movement in and out of range. That is, after the manual override is used, the system automatically reverts to UD control upon the next full UD proximity detection change cycle (out/in/out or in/out/in). Various UD and SPS transmission times and ranges can be used to control sensitivity of the device to a state change. These are controlled through the various algorithms on the CR, UD and SPS.

FIG. 6 depicts a second logical flow diagram for a configuration where the control decisions are made not at the SPS but by the CR, according to one or more embodiments. In this configuration, the SPS transmits to the CR both the SPS sensors information and the UD ID numbers that it is receiving as before. No decision information is held by the SPS. No SPS internal timer is used to change relay positions. The CR utilizes the information received from all SPSs to determine the correct state for each SPS node and transmits that information to the various SPSs to change specific relays and either interrupt or allow power flow to end devices. Because there may be UD information from multiple SPSs, this configuration may allow for a higher level of control including better relative position determination between the UD and SPS.

FIG. 7 depicts a third configuration where the UD does not communicate in any way to the SPS but instead communicates its real time absolute location to the CR, according to one or more embodiments. The CR then determines the relative location of the UD to the SPS and commands any required state changes to the SPS nodes. This is intended to provide the highest possible level of control as well as allow for third party RTLS or location service systems to provide the necessary information, removing the need for a redundant UD.

All three configurations include the ability of the CR to command SPS nodes based on; commands from the CR user interface (permission controlled), scheduled commands, power usage rules such as maximum SPS power usage, or other logical requirements.

In the current embodiment if the CR transmits information to an SPS, the SPS sends the received command ID number back to the CR for the next 3 standard transmissions to the CR. In this way, the CR ensures the SPS state and control logic is as desired. In addition, in the current embodiment, the CR can command the SPS to transmit its memory load information to allow monitoring of UD and SPS control information directly by the CR. All three configurations allow the local user to utilize the override system.

The preferred embodiment of the SPS includes either a smart power strip or smart outlet for plugged loads, a smart switch for switched loads or a smart thermostat for sensed nodes. The smart outlet and smart switch can take the form of a standard AC box unit such that no difference to the end user is perceived. The intended embodiment of the UD includes a key fob or security card device for any of the three depicted configurations. In addition, the UD can take the form of a cell phone, smartphone, or other personal electronic device transmitting RF signals.

The invention claimed is:

1. An autonomous system for managing power distribution to an electrically-powered device comprising:
   a power controller module, said power controller module including a power input interface configured for connection to a power source, a power output interface configured for connection to at least one power utilization device, and an intervening power control relay, said intervening power control relay being configured for actuation by an integral power management module operably connected with said intervening power control relay, said integral power management module including a wireless communication receiver and an interfaced microcontroller, said microcontroller being configured, in accordance with commands and operational parameters received from a command and operational parameter provider, for effecting selective response of said system to an actuation signal and altering said power output through said power output interface, and in response to said wireless communication receiver detecting said actuation signal, actuating said intervening power control relay to alter power output through said power output interface from a first power output level to a second power output level;
   said power controller module further including an integrated memory, said memory being configured to receive and store said commands and operational parameters from said command and operational parameters provider, said memory being operably connected with said microcontroller; and
   signal transmission means for transmitting said actuation signal.

2. The system of claim 1 wherein said signal transmission means is selected from a group consisting of a key fob, a security badge, a wallet card, and a mobile device such as a smart phone or tablet computer.

3. The system of claim 1 wherein said signal transmission means is configured for asynchronous transmission.

4. The system of claim 1 wherein said signal transmission means is configured to alternate between an active transmission mode and an inactive transmission mode wherein signal transmission only occurs during said active transmission mode.

5. The system of claim 1 wherein said signal transmission means is configured to allow a user to manually terminate transmission of said actuation signal.

6. The system of claim 1 wherein said signal transmission means is configured for user manipulation of said actuation signal.

7. A method for configuring a system for managing power distribution to an electrically-powered device through use of modular, autonomously operable controller-device assemblies comprising the steps of:
   selecting a power controller module, wherein said power controller module includes a power input interface configured for connection to a power source, a power output interface configured for connection to at least one power utilization device, and an intervening power control relay, said intervening power control relay being configured for actuation by an integral power management module operably connected with said intervening power control relay, said integral power management module including a wireless communication receiver and an interfaced microcontroller, said microcontroller being configured, in accordance with commands and operational parameters received from a command and operational parameter provider, for effecting selective response of said system to an actuation signal from signal transmission means and altering said power output through said power output interface, and in response to said wireless communication receiver detecting said actuation signal, actuating said intervening power control relay to alter power output through said power output interface from a first power output level to a second power output level;
   said power controller module further including an integrated memory, said memory being configured to receive and store said commands and operational parameters from said command and operational parameters provider, said memory being operably connected with said microcontroller;
   effecting transmission of commands and operational parameter by said command and operational parameter provider, said commands and operational parameters including specifications of said actuation signal for actuation of said system;
   connecting said power input interface to an electrical power source; and
   connecting an electrically-powered device to said power output interface.

8. The system of claim 7 wherein said signal transmission means is selected from a group consisting of a key fob, a security badge, a wallet card, and a mobile device such as a smart phone or tablet computer.

9. The system of claim 7 wherein said signal transmission means is configured for asynchronous transmission.

10. The system of claim 7 wherein said signal transmission means is configured to alternate between an active transmission mode and an inactive transmission mode wherein signal transmission only occurs during said active transmission mode.

11. The system of claim 7 wherein said signal transmission means is configured to allow a user to manually terminate transmission of said actuation signal.

12. The system of claim 7 wherein said signal transmission means is configured for user manipulation of said actuation signal.

\* \* \* \* \*